United States Patent [19]

Shimatani et al.

[11] Patent Number: 4,694,470
[45] Date of Patent: Sep. 15, 1987

[54] DATA TRANSMISSION CIRCUIT

[75] Inventors: Toshimichi Shimatani, Fuchu; Yoshihiro Kawata, Tokorozawa, both of Japan

[73] Assignee: Iwatsu Electric Co. Ltd., Tokyo, Japan

[21] Appl. No.: 796,554

[22] Filed: Nov. 8, 1985

[30] Foreign Application Priority Data

Nov. 14, 1984 [JP] Japan ............... 59-239696

[51] Int. Cl.[4] .......................................... H04L 23/00
[52] U.S. Cl. .................................... 375/37; 375/121; 178/69 R
[58] Field of Search .................... 375/36, 37, 121; 370/37, 43, 84; 179/2 C, 2 DP; 379/399, 423; 178/69 R

[56] References Cited

U.S. PATENT DOCUMENTS

| | | | |
|---|---|---|---|
| 4,121,217 | 10/1978 | Chen | 375/37 |
| 4,317,207 | 2/1982 | Fujimura et al. | 375/121 |
| 4,366,572 | 12/1982 | Takatsuki et al. | 375/37 |
| 4,466,107 | 8/1984 | Stoner | 375/37 |
| 4,520,488 | 5/1985 | Houvig et al. | 375/36 |
| 4,534,039 | 8/1985 | Dodds et al. | 376/36 |
| 4,542,517 | 9/1985 | Goss et al. | 375/36 |

Primary Examiner—Robert L. Griffin
Assistant Examiner—Stephen Chin
Attorney, Agent, or Firm—Robert E. Burns; Emmanuel J. Lobato

[57] ABSTRACT

A data transmission circuit is disclosed which is arranged so that when transmitting data and control signals of a terminal equipment accommodated in a transmission line of 64 Kbps channels through use of a multi-frame arrangement, the data is assigned to a required number of bits in a predetermined number of frames in the multi-frame or adjacent ones of the predetermined number of bits and at least one synchronization flag bit and various control signals are assigned to the remaining bits but a request to send signal and the synchronization being assigned to one of the remaining bits according to the logic OR of their succeeding sampled values, whereby data of different transmission speeds can be transmitted by the same circuit.

2 Claims, 9 Drawing Figures

| BIT NO.<br>FRAME NO. | 0 | 1 | 2 | 3 | 4 | 5 | 6 | 7 |
|---|---|---|---|---|---|---|---|---|
| FRAME 0 | F | D0 | D0 | D1 | D1 | D2 | D2 | RS/CD |
| FRAME 1 | SY | D3 | D3 | D4 | D4 | D5 | D5 | CS'/CS |
| FRAME 2 | | D6 | D6 | D7 | D7 | D8 | D8 | ER/DR |
| FRAME 3 | | D9 | D9 | D10 | D10 | D11 | D11 | CI'/CI |
| FRAME 4 | | | | | | | | |
| FRAME 5 | | | | | | | | |
| FRAME 6 | | | | | | | | |
| FRAME 7 | | | | | | | | |
| FRAME 8 | | | | | | | | |
| FRAME 9 | | | | | | | | |

DATA TRANSMISSION CIRCUIT

BACKGROUND OF THE INVENTION 1. (Technical Field of the Invention)

The present invention relates to a circuit which permits simple and accurate transmission of a signal from a terminal equipment having an interface such, for example, as JIS-C6361, to an electronic exchange.

2. (Prior Art)

Conventionally, a transmission speed converter once converts transmission speeds of 2.4 and 4.8 Kbps to 8 Kbps and a transmission speed of 9.6 Kbps to 16 Kbps, and then converts the transmission speed of 8 Kbps to 16 Kbps by bit repetition and converts it again to 64 Kbps by bit repetition. For example, in case of 2.4 Kbps, the conventional converter once converts it to 4.8 Kbps and then to 8, 16 and 64 Kbps in a sequential order, and hence has the defect of involving complex circuitry.

The prior art suffers a defect of low transmission efficiency because of sampling of an RS signal at a rate equal to the data transfer rate with a view to eliminating a delay which would otherwise be caused by its sampling. If the sampling rate is made lower than the data transfer rate so as to raise the RS signal transmission efficiency, it is likely that an error occurs.

SUMMARY OF THE INVENTION

An object of the present invention is to provide a data transmission circuit which, in an electronic exchange, adopts a multi-frame arrangement and accommodates data of various transmission speeds and a control signal in a transmission line of 64 Kbps, that is, accommodates data of different transmission speeds in one circuit, thereby ensuring accurate data transmission.

To attain the above object of the present invention, a data transmission circuit is proposed which is arranged so that when transmitting data and control signals of a terminal equipment accommodated in a transmission line of 64 Kbps channels through use of a multi-frame arrangement, the data is assigned to a required number of bits in a predetermined number of frames in the multi-frame or adjacent ones of the predetermined number of bits and at least one synchronization flag bit and various control signals are assigned to the remaining bits but a request to send signal in the control signals being assigned to one of the remaining bits according to the logic OR of their succeedng sampled values, whereby data of different transmission speeds can be transmitted by the same circuit.

BRIEF DESCRIPTION OF THE DRAWINGS

The present invention will be described in detail below with reference to the accompanying drawings, in which.

DETAILED DESCRIPTION

Figure 1:
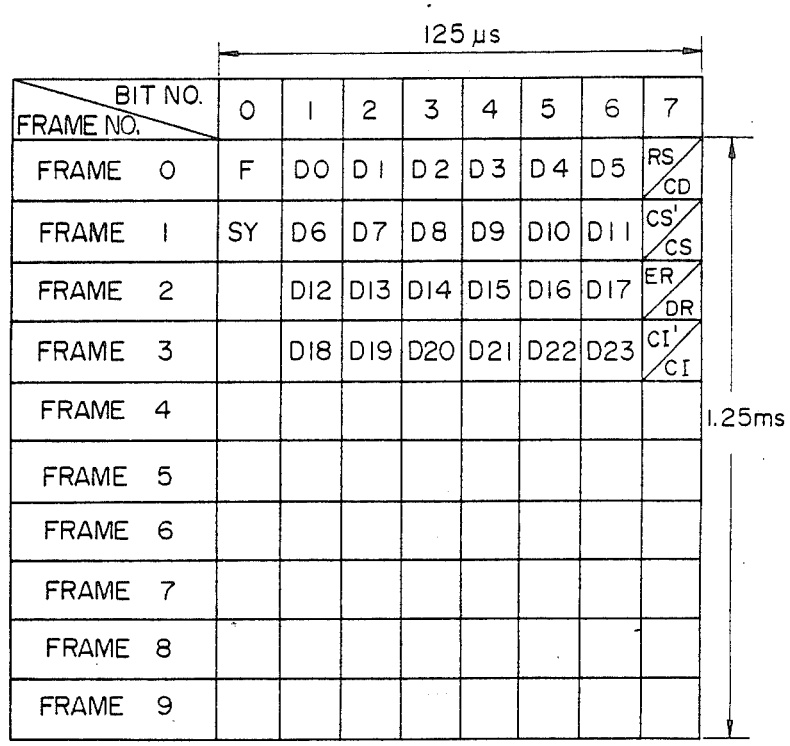
FIG. 1 is a timing chart showing time slots for accommodating respective control signals and data of a 19.2 Kbps transmission speed.
Figures 2, 3:
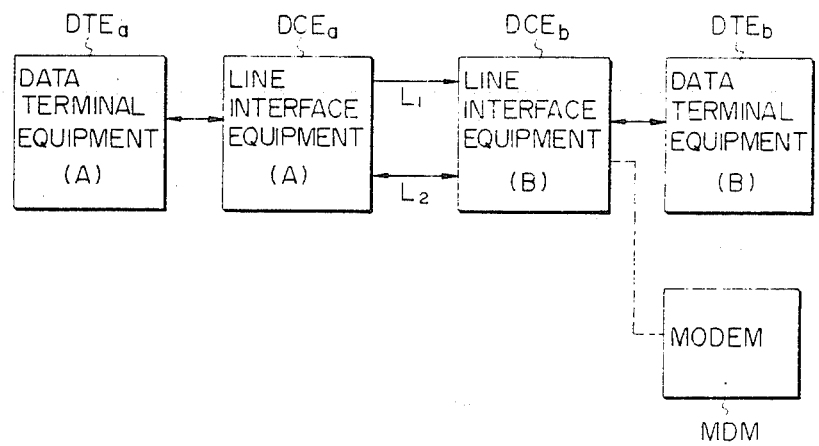
FIG. 2 is a timing chart showing time slots for accommodating respective control signals and data of a 9.6 Kbps transmission speed in the present invention.
FIG. 3 is a block diagram illustrating a transmission system embodying the present invention.

With reference to FIGS. 1 and 2, the principle of the present invention will first be described in detail.

FIG. 1 is a diagram showing the principles established to accommodate a terminal equipment having a speed of 19.2 Kbps in an electronic exchange with a 64 Kbps transmission line. Flag synchronizing bits (F bits) at a bit "0" position of a frame "0" is to notify the frame position to a receiving party by transmitting a flag pattern "1010". The receiving party can easily recognize the frame position by detecting the flag pattern. To accommodate the 19.2 Kbps terminal equipment in the 64 Kbps transmission line, it is necessary only to accommodate data D0 to D23 of 24 bits in specified bit positions every 10 multi-frames, as shown in FIG. 1.

Incidently, blank fields are not used.

FIG. 2 shows the principles established to accommodate a 9.6 Kbps terminal equipment. If data D0 to D11 of 12 bits which is one-half that in the case of 19.2 Kbps in FIG. 1 can be accommodated, a transmission speed conversion is possible. In this instance, however, in order to accommodate data of different transmission speeds in the same circuit, which is characteristic of the present invention, the same data is inserted twice in succession, as depicted in FIG. 2, thereby to accommodate data of a transmission speed different from 19.2 Kbps. In a similar manner, data of 4.8 Kbps and data of 2.4 Kbps can be accommodated by inserting the same data four times and eight times in succession, respectively.

A description will be given, with reference to FIG. 3, of the principle of a synchronization establishing bit (a SY bit) at the bit 0 position of the frame 1. In FIG. 3, reference characters $L_1$ and $L_2$ indicate lines which are transmitting and receiving lines, respectively, as viewed from the party of equipment (A), but receiving and transmitting lines, as viewed from the party of equipment (B). The following description will be given, with the above lines as viewed from the party (A).

The equipment DCEa on the party (A) detects the F bit on the receiving line $L_2$ and, upon establishment of synchronization, puts the SY bit into its ON state and provides it on the transmitting line $L_1$. The equipment DCEb on the party (B) similarly provides the ON state of the SY bit on the receiving line $L_2$ when synchronization of the transmitting line $L_1$ is established by the F bit. Thus the equipment DCEa on the party (A) can detect the synchronized state of the transmitting line $L_1$ by monitoring the SY bit on the receiving line $L_2$. This also true for the equipment DCEb on the party (B). Control line information defind by JIS-C6361 is accommodated in bits 7 of frames 0 to 3. In FIGS. 1 and 2, signals above oblique lines are control signals to be provided on the transmitting line $L_1$ and signals below the oblique lines are control signals to be received from the receiving line $L_2$.

In FIG. 2, RS indicates a request-to-send signal for requesting transmission, CD a carrier detect signal, CS and CS' clear-to-send signals, ER an equipment ready signal, DR a data set ready signal and CI and CI' call indicator signals.

Figure 4:
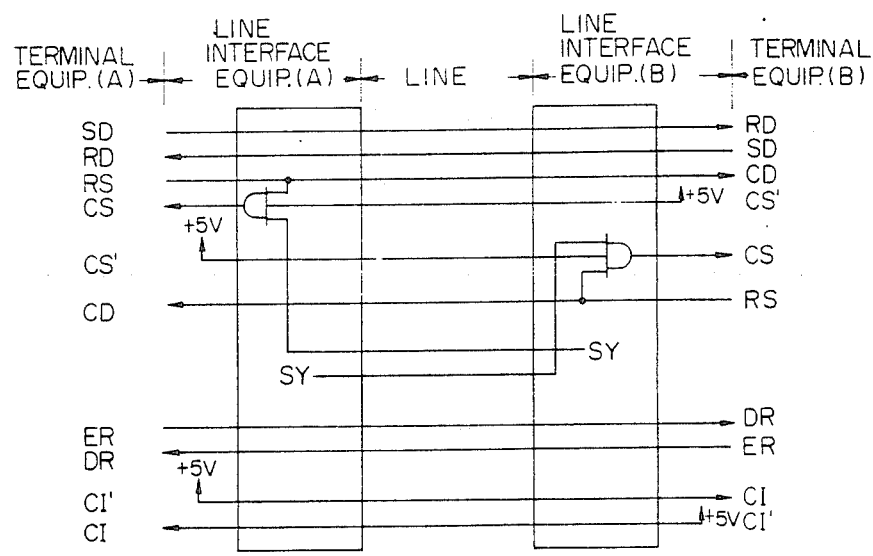
FIG. 4 is a diagram showing a control signal transmission system between terminal equipments according to the present invention.
Figure 5:
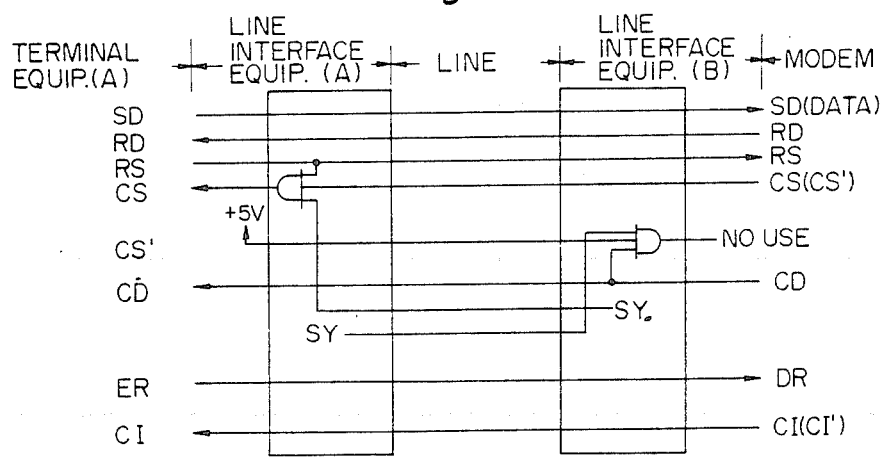
FIG. 5 is a diagram showing a control signal transmission system between a terminal equipment and a modem according to the present invention.

FIG. 4 shows a method for accommodating control signals between terminal equipments and FIG. 5 a method for accommodating control signals between a terminal equipment and a modem.

In FIG. 4, since terminal equipments (A) and (B) are interfaces of the same input/output relationship, send data SD sent from the terminal equipment (A) is received as receiving data RD at the terminal equipment (B). Likewise, the other lines are connected as shown. Transmission lines are shown to be connected to have a one-to-one correspondence to each other for the sake of clarity, but since data is accommodated in such formats as depicted in FIGS. 1 and 2, the transmission lines are concentrated to the two transmitting and receiving lines $L_1$ and $L_2$, as shown in FIG. 3. As is evident from the principles described previously in conjunction with FIGS. 1 and 2, since the control signals are sampled only once every 10 frames, for example, even if the terminal equipment (A) turns ON the RS (Request to Send) signal, the carrier detect signal CD in the terminal equipment (B) is delayed by 1.25 ms at most in turning ON. Accordingly, the terminal equipment (B) cannot receive the receive data RD from the terminal equipment (A) if it arrives before the carrier detect signal CD turns ON.

To avoid this, the carrier detect signal CD is held in the ON state during data reception, by determining the value of the request-to-send signal in terms of the logic OR of its previous and current sampled values and by determining the state of data transmission over the transmission line, as shown below in Table 1.

TABLE 1

| Previous state | Current state | Transmission state |
|---|---|---|
| OFF | OFF | OFF |
| OFF | ON | ON |
| ON | OFF | ON |
| ON | ON | ON |

Figure 6:
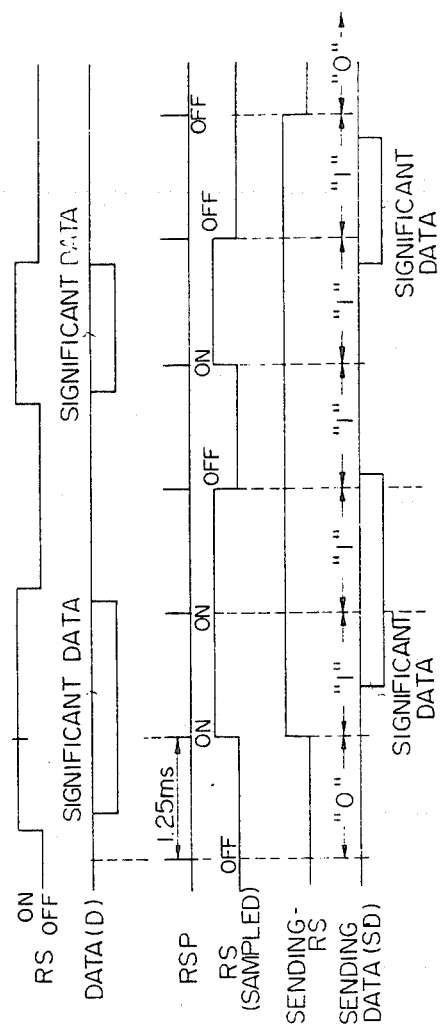
FIG. 6 is a timing chart showing an example of transmission of a request-to-send signal RS in the present invention.

FIG. 6 shows the relationship between the request-to-send signal RS and the send data SD. The request-to-send signal RS and the data SD bear such a relation that data D is valid while the request-to-send signal RS is in the ON state. Sampling it in units of 10 multi frames (1.25 ms), RS sample pulses (RSP) are obtained. However, by delaying the data D by 1.25 ms and providing it as the send data SD on the transmission line and making the state decision of Table 1 to determine the value of the request-to-send signal RS, the relationship between the request-to-send signal RS and the data D becomes as shown, assuring the abovesaid relationship.

Figure 7:
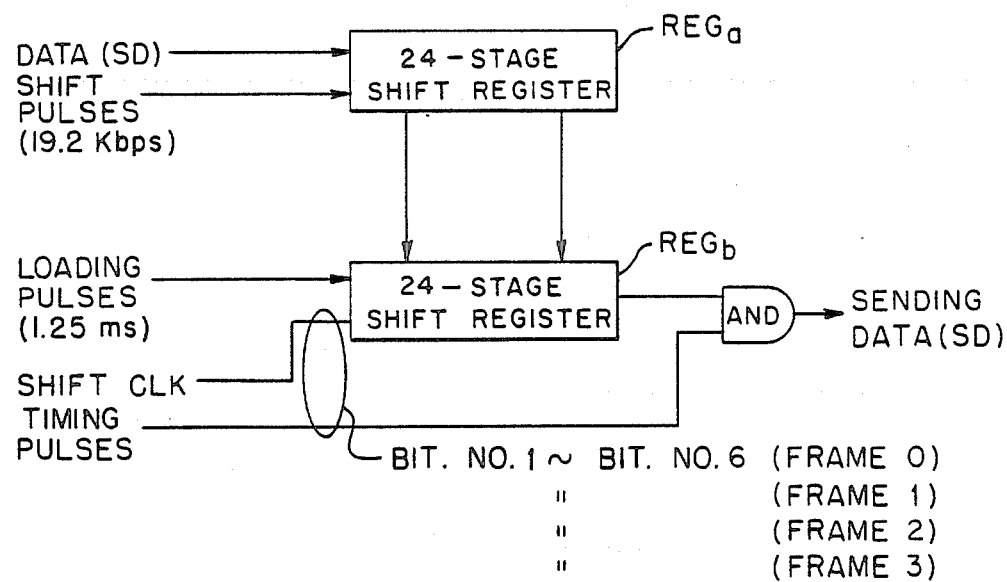
FIG. 7 is a block diagram illustrating an example of a signal delay circuit for use in the present invention.

The delay of data for 1.25 ms can be accomplished by providing 24-stage registers, as shown in FIG. 7, and by selecting timings, load pulses to be 1.25 ms for shifting the data from the register REGa to the register REGb. The reason for the provision of 24 stages of registers is to insert 24 bits in the afore-mentioned 10 multi frames.

FIG. 5 shows the connection of a terminal equipment and a modem. Unlike in FIG. 4, the send data SD is connected to the send data SD of the modem in a manner to have a one-to-one correspondence to each other. The other control signals are also connected to have a one-to-one correspondence to each other, as shown. Furthermore, the signals CS and CI, which are output from the modem, can easily be implemented by the connection to CS' and CI'.

(EFFECT OF THE INVENTION)

Figure 8:
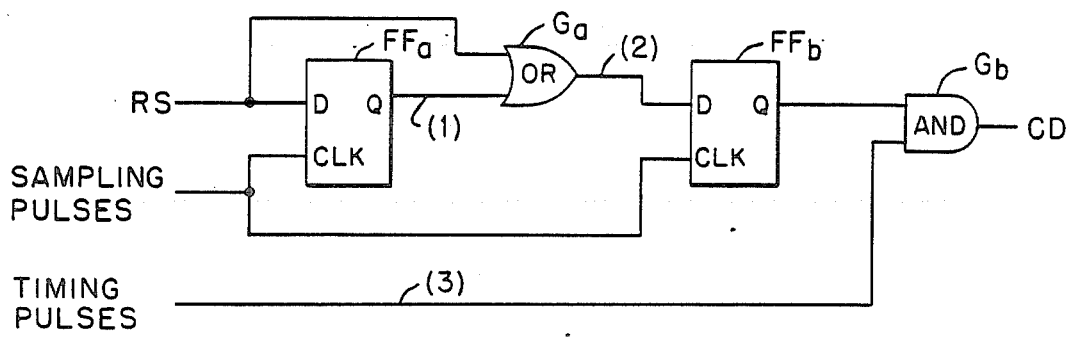
FIG. 8 is a diagram for determining request-to-send signal values according to the invention.

An example of a circuit for determining the value of the request-to-send RS signal is shown in FIG. 8.

The RS signal is applied to a D flip-flop FFa to provide a signal (1) of previous sampled values. The logic OR (2) of the signal (1) of previous sampled values and the RS signal is obtained at an OR gate Ga and applied to a D flip-flop FFb. The output of the D flip-flop FFb is sent out as the carrier detect signal CD through an AND gate Gb, which is opened by each timing pulse of bit No. 7 in frame 0.

Figure 9:
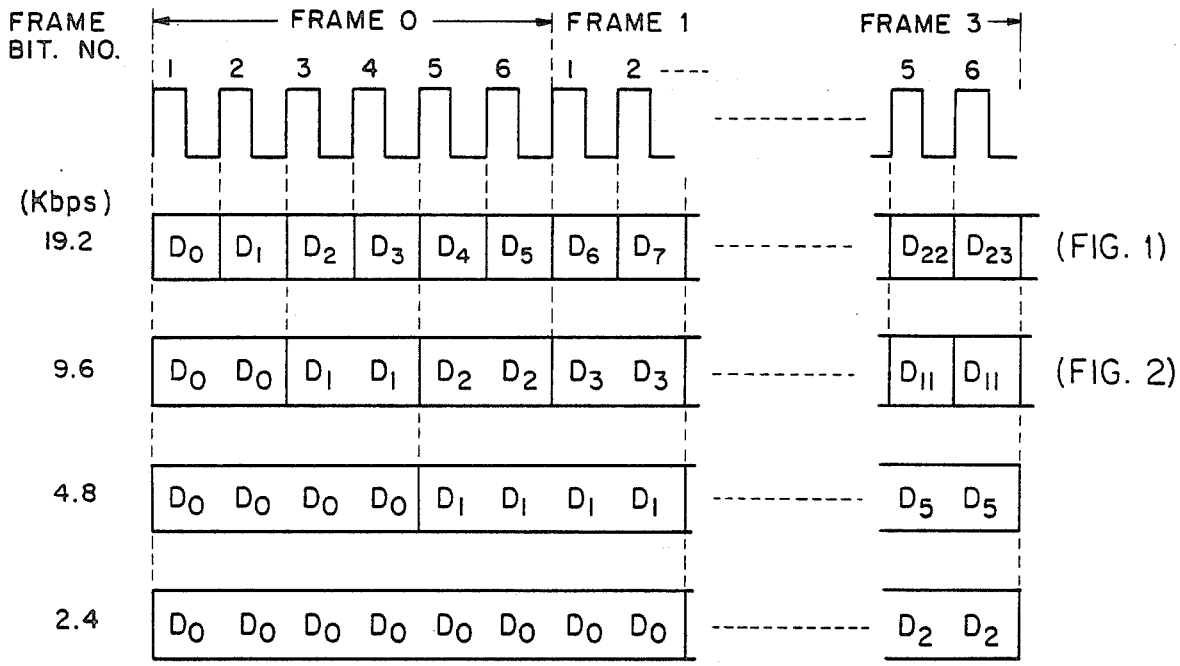
FIG. 9 is an explanatory diagram for explaining different speed transmissions according to the invention.

Different transmission speeds are accommodated as follows:

(a) Send data SD of 19.2 Kbps is sampled and shifted in a 24-state shift register REGa FIG. 7 by sampling pulses of 19.2 Kbps as shown in FIG. 9.

The shifted pulses are transferred from the register REGa to a 24-stage shift register REGb by load pulses, which have the same repetition period of 1.25 ms as that of the frame repetition period. The transferred pulses of 24 bits are successively sent out as sending data SD in times of bit No. 1 to bit No. 6 in frame 0 to frame 3 (i.e. $D_0, D_1, D_2, \ldots D_{22}, D_{23}$).

(b) Send data SD of 19.2 Kbps is also sampled by the same sampling pulses of 19.2 Kbps, so that each data ($D_0 \ldots D_{11}$) of 9.6 Kbps is twice-sampled as shown in FIG. 9. in the circuit shown in FIG. 7 and then similarly processed to obtain sending data SD of 9.6 Kbps.

(c) Sending data SD of 4.8 Kbps and 2.4 Kbps are also sampled by the same sampling pulses of 19.2 Kbps, so that each data ($D_0 \ldots D_5$) of 4.8 Kbps and each data ($D_0 \ldots D_2$) of 2.4 Kbps are four-time sampled to eight-time sampled as shown in FIG. 9 in the circuit shown in FIG. 7 and then similarly processed to obtain send data SD of 4.8 Kbps or 2.4 Kbps.

As described above in detail, the present invention accommodates terminal equipments of different transmission speeds in the same circuit, and hence is simple in circuit arrangement and extremely advantageous from the economical point of view.

Moreover, since the value of the request-to-send signal RS is determined by comparing its previous and current sampled values, it is possible to implement a circuit arrangement which is not dependent upon the sampling time of the request-to-send signal RS, assuring accurate data transmission.

Besides, the CS' signal is used, by which a terminal equipment can easily be connected to the existing modem.

What we claim is:

1. In a data transmission circuit accommodated in a transmission line of 64 Kbps channels through a multi-frame arrangement for transmitting data and control signals of a terminal equipment, the improvement in which a predetermined small number of frames of said multi-frame arrangement have assigned thereto a required number of bits, corresponding to data being transmitted, at least one synchronization flag bit and various control signals are assigned to the remaining bits but a request-to-send signal in the control signals is assigned to one of the remaining bits according to a logice OR of succeeding sampled values of the request to send signal, so that data of different transmission speeds can be transmitted by the same circuit, sampling means for effecting sampling of said succeeding sampled values of the request-to-send signal, and means for determining the value of the succeeding request-to-send signals prior to the sampling thereof.

2. A data transmission circuit according to claim 1, in which the data of a higher transfer rate are assigned to successive bits of a required number of bits, while the data of a lower transfer rate equal to half the higher transfer rate are each assigned to adjacent ones of successive bits of a required number of bits.

* * * * *